United States Patent
Kojima et al.

(10) Patent No.: US 12,519,169 B2
(45) Date of Patent: Jan. 6, 2026

(54) LEAD-ACID BATTERY

(71) Applicant: GS Yuasa International Ltd., Kyoto (JP)

(72) Inventors: Yu Kojima, Shizuoka (JP); Shinsuke Oki, Shizuoka (JP); Tatsuya Morii, Shizuoka (JP)

(73) Assignee: GS Yuasa International Ltd., Kyoto (JP)

(*) Notice: Subject to any disclaimer, the term of this patent is extended or adjusted under 35 U.S.C. 154(b) by 756 days.

(21) Appl. No.: 17/760,943

(22) PCT Filed: Sep. 7, 2020

(86) PCT No.: PCT/JP2020/033729
§ 371 (c)(1),
(2) Date: Mar. 16, 2022

(87) PCT Pub. No.: WO2021/054162
PCT Pub. Date: Mar. 25, 2021

(65) Prior Publication Data
US 2022/0344763 A1   Oct. 27, 2022

(30) Foreign Application Priority Data
Sep. 20, 2019   (JP) ................. 2019-171067

(51) Int. Cl.
*H01M 50/256*   (2021.01)
*H01M 10/12*   (2006.01)
(Continued)

(52) U.S. Cl.
CPC ........ *H01M 50/256* (2021.01); *H01M 10/12* (2013.01); *H01M 50/114* (2021.01);
(Continued)

(58) Field of Classification Search
None
See application file for complete search history.

(56) References Cited

U.S. PATENT DOCUMENTS 4,673,625 A * 6/1987 McCartney ......... H01M 50/256
16/DIG. 15
5,637,420 A   6/1997 Jones, Jr. et al.
(Continued)

FOREIGN PATENT DOCUMENTS

JP   S58148875 U   10/1983
JP   S6166861 U   5/1986
(Continued)

OTHER PUBLICATIONS

International Search Report (ISR) dated Nov. 10, 2020 filed in PCT/JP2020/033729.

*Primary Examiner* — Alix E Eggerding
(74) *Attorney, Agent, or Firm* — RANKIN, HILL & CLARK LLP

(57) ABSTRACT

A lid (15) of a lead-acid battery (100) includes a projecting portion (20) projecting from a base portion (19). The projecting portion (20) includes a shaft portion (27) serving as a rotation shaft of a handle (23), and an opposing wall (28) intersecting an imaginary line passing through an axial center of the shaft portion (27). A grip portion (90) of the handle (23) is located on an outer periphery of a first projecting portion (21).

4 Claims, 5 Drawing Sheets

(51) Int. Cl.
*H01M 50/114* (2021.01)
*H01M 50/148* (2021.01)
*H01M 50/55* (2021.01)
*H01M 50/552* (2021.01)

(52) U.S. Cl.
CPC ......... *H01M 50/148* (2021.01); *H01M 50/55* (2021.01); *H01M 50/552* (2021.01)

(56) References Cited

U.S. PATENT DOCUMENTS

| | | | |
|---|---|---|---|
| 6,929,882 | B1 | 8/2005 | Carter |
| D782,409 | S | 3/2017 | Tyler et al. |
| D830,965 | S | 10/2018 | Varatharajah et al. |
| D875,667 | S | 2/2020 | Tyler et al. |
| 2008/0241653 | A1 | 10/2008 | Chang |
| 2013/0029199 | A1 | 1/2013 | Andersen |
| 2013/0171503 | A1* | 7/2013 | Lee .................. H01M 10/6555 429/150 |
| 2013/0257388 | A1 | 10/2013 | Lee |
| 2016/0197320 | A1 | 7/2016 | Mack et al. |
| 2016/0197321 | A1 | 7/2016 | Tyler et al. |
| 2016/0197322 | A1 | 7/2016 | Tyler et al. |
| 2016/0197323 | A1 | 7/2016 | DeKeuster |
| 2016/0197324 | A1 | 7/2016 | DeKeuster et al. |
| 2016/0197329 | A1 | 7/2016 | Mack et al. |
| 2016/0197331 | A1 | 7/2016 | Mack et al. |
| 2016/0197333 | A1 | 7/2016 | DeKeuster et al. |
| 2016/0197336 | A1 | 7/2016 | Tyler et al. |
| 2016/0197383 | A1 | 7/2016 | DeKeuster et al. |
| 2016/0197384 | A1 | 7/2016 | DeKeuster |
| 2017/0309876 | A1 | 10/2017 | An et al. |
| 2017/0331081 | A1* | 11/2017 | Choi .................. H01M 50/256 |
| 2018/0102517 | A1 | 4/2018 | Tononishi |
| 2018/0287126 | A1 | 10/2018 | DeKeuster et al. |
| 2019/0157652 | A1 | 5/2019 | Mack et al. |
| 2019/0379018 | A1* | 12/2019 | Varatharajah ....... H01M 50/529 |
| 2020/0287197 | A1 | 9/2020 | Mack et al. |
| 2021/0036301 | A1 | 2/2021 | DeKeuster et al. |

FOREIGN PATENT DOCUMENTS

| | | |
|---|---|---|
| JP | S61250966 A | 11/1986 |
| JP | S61250967 A | 11/1986 |
| JP | S6266562 A | 3/1987 |
| JP | S6312158 U | 1/1988 |
| JP | S6329848 U | 2/1988 |
| JP | S6332455 U | 3/1988 |
| JP | H04101361 U | 9/1992 |
| JP | H04101363 U | 9/1992 |
| JP | H04121652 U | 10/1992 |
| JP | H04121653 U | 10/1992 |
| JP | H10584022 U | 11/1993 |
| JP | 3022152 U | 3/1996 |
| JP | H08329916 A | 12/1996 |
| JP | H097569 A | 1/1997 |
| JP | 3040746 U | 8/1997 |
| JP | H1040894 A | 2/1998 |
| JP | H10208715 A | 8/1998 |
| JP | H10508423 A | 8/1998 |
| JP | 2004200014 A | 7/2004 |
| JP | 3176671 U | 6/2012 |
| JP | 2015220202 A | 12/2015 |
| JP | 2018506840 A | 3/2018 |
| JP | 2018063944 A | 4/2018 |
| JP | 2018509737 A | 4/2018 |
| JP | 2018186053 A | 11/2018 |
| WO | 2016112410 A1 | 7/2016 |
| WO | 2018140776 A1 | 8/2018 |
| WO | 2019150428 A1 | 8/2019 |

* cited by examiner

LEAD-ACID BATTERY

TECHNICAL FIELD

The present invention relates to a lead-acid battery.

BACKGROUND ART

Lead-acid batteries are in use for various applications, including automotive and industrial applications. A lead-acid battery includes an element in which a positive electrode plate and a negative electrode plate are alternately stacked with a separator interposed therebetween. In the lead-acid battery, the element is immersed in an electrolyte solution held in a container, and an opening portion of the container is sealed by a lid body. Some of such lead-acid batteries include a handle used for carrying the lead-acid battery on a lid.

For example, Patent Document 1 discloses a handle with both end portions serving as handle base portions in which fitting shafts extending coaxially with each other are provided on attaching base portions so that the handle is rotatable, coupling holes extending in a horizontal direction for inserting the fitting shafts are provided in an upper portion of a storage battery, support pieces are erected on an upper surface of the storage battery, the support pieces being disposed to face openings of the coupling holes with a predetermined interval, and the fitting shafts inserted into the coupling holes are prevented from coming out of the coupling holes by the support pieces.

PRIOR ART DOCUMENT

Patent Document

Patent Document 1: Japanese Utility Model Registration No. 3040746

SUMMARY OF THE INVENTION

Problems to be Solved by the Invention

In the inside of the lid of the lead-acid battery, various structures such as a maze structure for refluxing the electrolyte solution may be provided for the purpose of improving the liquid depletion performance and the overflow performance. However, the handle having the shape described in Patent Document 1 has a problem that the handle interferes with the structure inside the lid and the degree of freedom in designing the lid is low.

The present invention has been made in view of the above problems, and an object thereof is to provide a lead-acid battery having a high degree of freedom in designing a lid.

Means for Solving the Problems

In order to solve the above problems, a lead-acid battery according to the present invention is a lead-acid battery including a container in which a plurality of elements and an electrolyte solution are accommodated, the container having an opening portion, and a lid for sealing the opening portion, in which the lid includes a base portion including a positive electrode terminal and a negative electrode terminal, and a projecting portion projecting from the base portion, in which the projecting portion includes a handle rotatably provided, and a first projecting portion positioned between the positive electrode terminal and the negative electrode terminal, in which the projecting portion includes a shaft portion serving as a rotation shaft of the handle, and an opposing wall intersecting an imaginary line passing through an axial center of the shaft portion, in which the handle includes an attaching portion fitted to the shaft portion, and a grip portion, and in which, when the lid is viewed in a plan view from a projecting direction of the projecting portion, the grip portion is located on an outer periphery of the first projecting portion.

MODE FOR CARRYING OUT THE INVENTION

Hereinafter, embodiments of the present invention will be described in detail with reference to the drawings.

[Schematic Configuration of Lead-Acid Battery 100]

Figure 1:
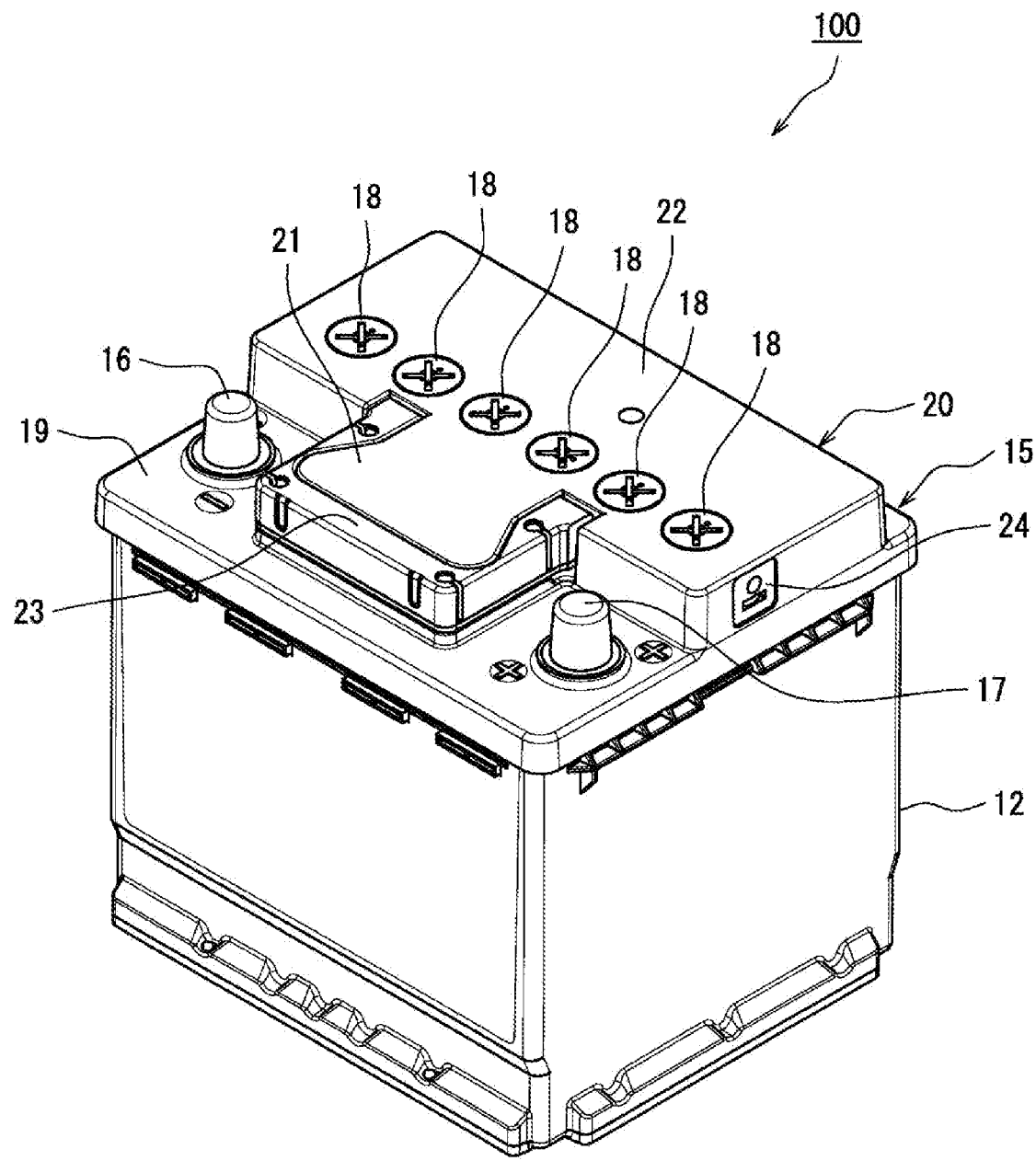
FIG. 1 is a perspective view showing a lead-acid battery 100 according to an embodiment of the present invention.
Figure 2:
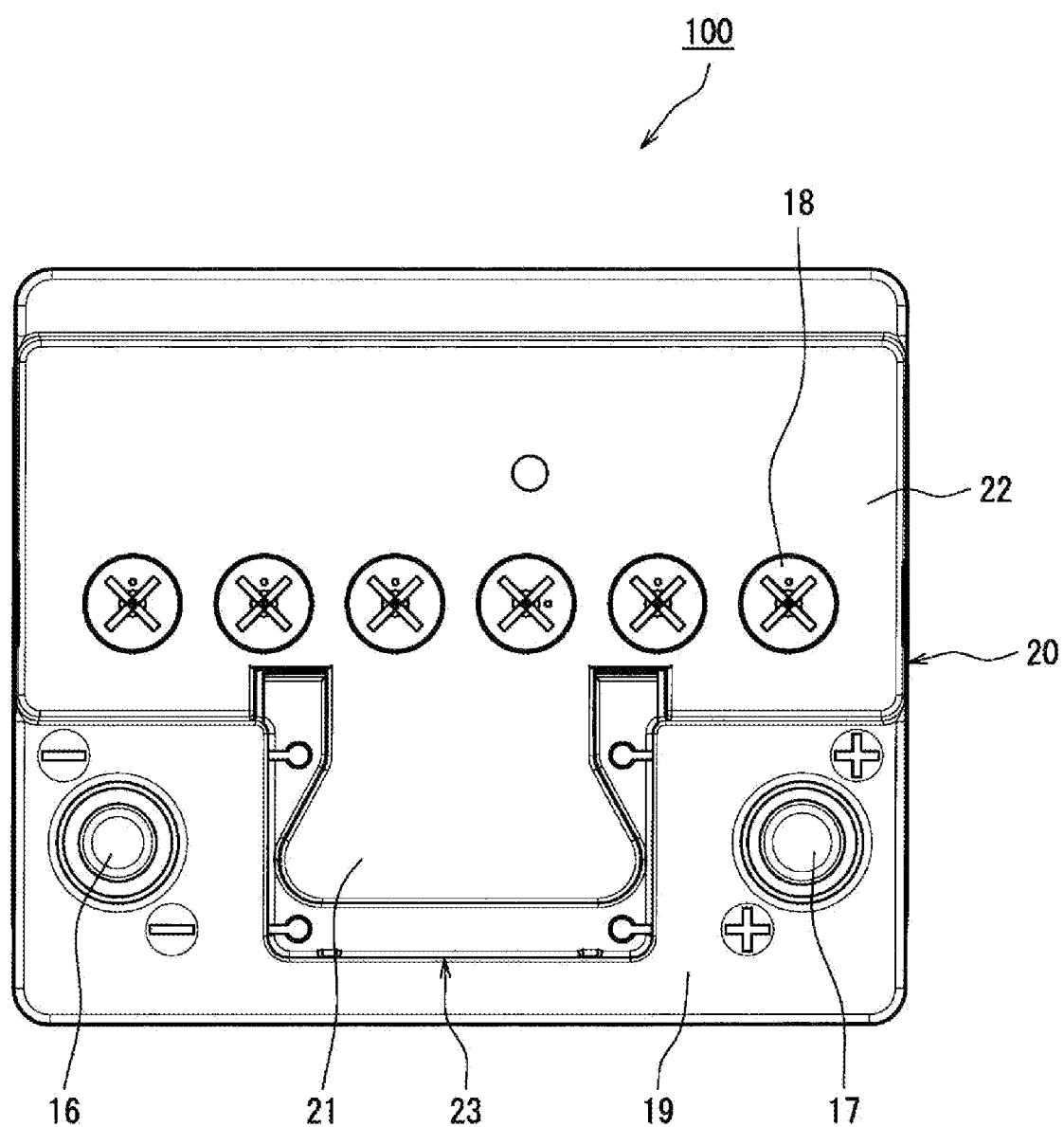
FIG. 2 is a bottom view showing the lead-acid battery 100 according to the embodiment of the present invention.

FIG. 1 is a perspective view showing a lead-acid battery 100 according to an embodiment of the present invention. FIG. 2 is a top view of the lead-acid battery 100. As shown in FIG. 1, the lead-acid battery 100 includes a plurality of elements (not shown), an electrolyte solution (not shown), a container 12 which accommodates the elements and the electrolyte solution and has an opening portion on the upper side, and a lid 15 which seals the opening portion of the container 12.

The container 12 is a substantially rectangular parallelepiped case having the opening portion on the upper surface, and is formed of, for example, a synthetic resin. The container 12 has a partition wall. The inside of the container is partitioned into a plurality of cell chambers arranged in a predetermined direction by the partition wall. An element is disposed in each of the plurality of cell chambers.

The opening portion of the container 12 is sealed with the lid 15 having a shape corresponding to the opening portion. More specifically, the peripheral edge portion of the lower surface of the lid 15 and the peripheral edge portion of the opening portion of the container 12 are joined to each other by, for example, thermal welding. The lid 15 includes a base portion 19 and a projecting portion 20 projecting from the base portion 19. The base portion of the lid 15 includes a negative electrode terminal 16 and a positive electrode terminal 17.

The projecting portion 20 of the lid 15 includes a first projecting portion 21 located between the positive electrode terminal 17 and the negative electrode terminal 16, and a second projecting portion 22 extending in parallel to the arrangement direction of the positive electrode terminal 17 and the negative electrode terminal 16. The projecting portion 20 includes a handle 23 provided for a user to grip the lead-acid battery 100, and the handle 23 is rotatably provided. The first projecting portion 21 and the second projecting portion 22 project from the base portion 19, and the projecting direction of the first projecting portion 21 and the second projecting portion 22 is the same direction as the projecting direction of the projecting portion 20 from the base portion 19.

The second projecting portion 22 is provided with water filling ports at positions corresponding to the cell chambers, and the lid 15 is provided with vent plugs 18 for sealing the water filling ports. In the example shown in FIG. 1, the lid 15 includes six vent plugs. When water addition is performed on the lead-acid battery 100, an operator removes the vent plugs 18 and adds refilling liquid.

Hereinafter, for convenience of description, a direction from the first projecting portion 21 toward the positive electrode terminal 17 or the negative electrode terminal 16 is referred to as an outer direction, and a direction from the positive electrode terminal 17 or the negative electrode terminal 16 toward the first projecting portion 21 is referred to as an inner direction. A direction (projecting direction) in which the projecting portion 20 projects from the base portion 19 is defined as an upward direction (first direction), and a direction opposite to the upward direction is defined as a downward direction. The direction in the description of the handle 23 represents a direction in a state where the handle 23 is accommodated in the lid 15 as shown in FIG. 2 unless otherwise specified.

A vent hole 24 is provided in a side surface of the second projecting portion 22 of the lid 15. The vent hole 24 is connected to an exhaust path (not shown) provided in the lid 15, and discharges gas generated in each cell chamber to the outside. In addition, the vent hole 24 is provided at an end portion in the arrangement direction in which the vent plugs 18 are arranged when the lid 15 is viewed from the top. In other words, the vent hole 24 is provided such that the vent plugs 18 and the vent hole 24 are on a straight line.

Figure 3:
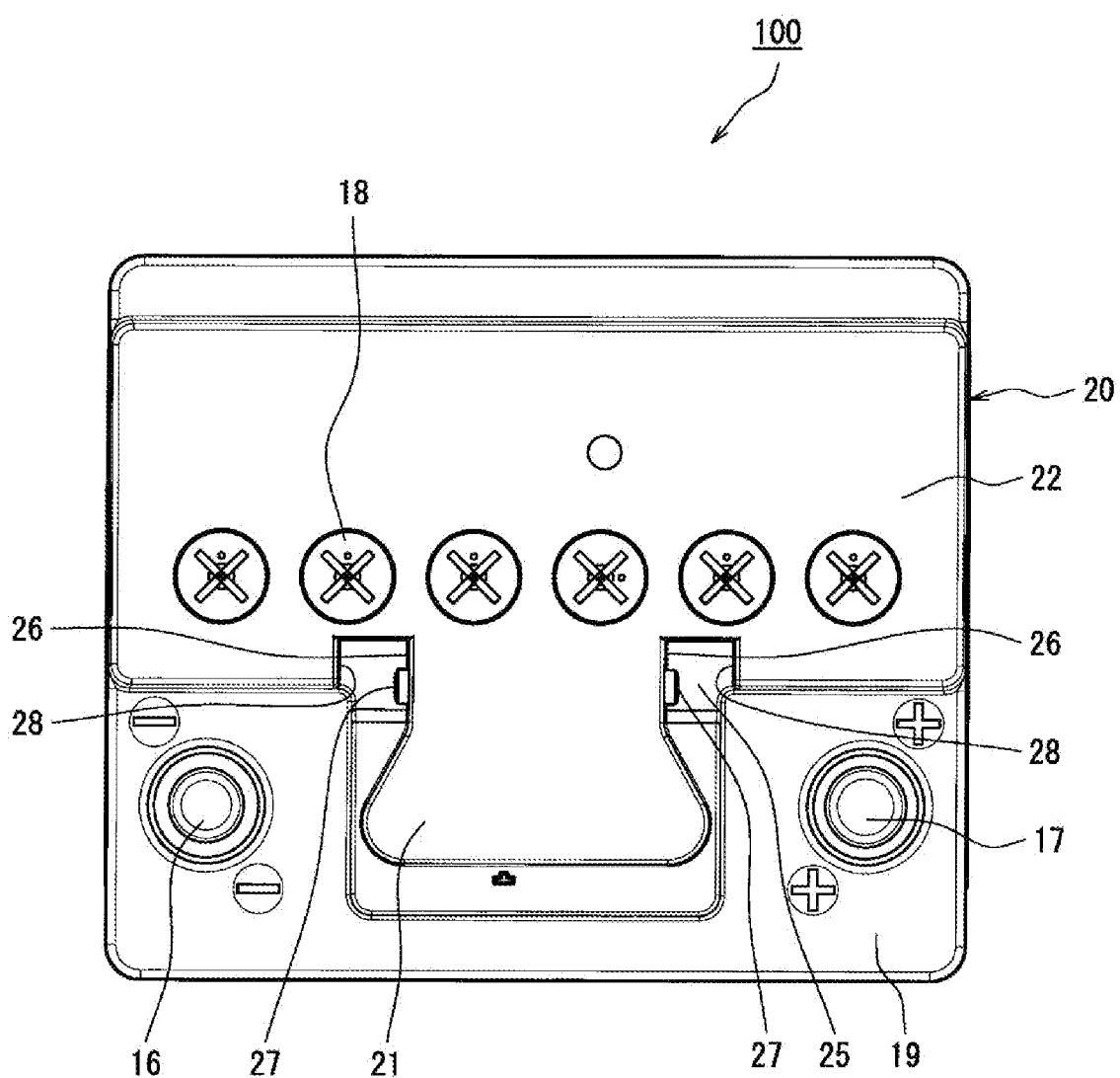
FIG. 3 is a view showing a state in which a handle 23 is detached from the lead-acid battery 100 shown in FIG. 2.

FIG. 3 is a view showing a state in which the handle 23 is detached from the lead-acid battery 100. Here, as shown in FIG. 3, recessed portions 25 are formed at positions corresponding to attaching portions 70 (see FIG. 4) of the handle 23 described later on the projecting portion 20 of the lid 15. The recessed portion 25 includes inner wall portions 26 which are wall surfaces perpendicular to the inner direction and parallel to the vertical direction, a shaft portion 27 projecting from the inner wall portions 26 in the outer direction, and opposing walls 28 which are wall surfaces perpendicular to the outer direction and parallel to the vertical direction.

The shaft portion 27 is a protrusion having a substantially columnar shape, and is a rotation shaft for enabling the handle 23 to rotate. The opposing walls 28 are provided so as to face the inner wall portions 26. Here, the axial center of the shaft portion 27 faces the opposing walls 28. In other words, considering an imaginary line passing through the axial center of the shaft portion 27, the imaginary line is provided so as to intersect the opposing walls 28.

[Schematic Configuration of Handle 23]

Figure 4:
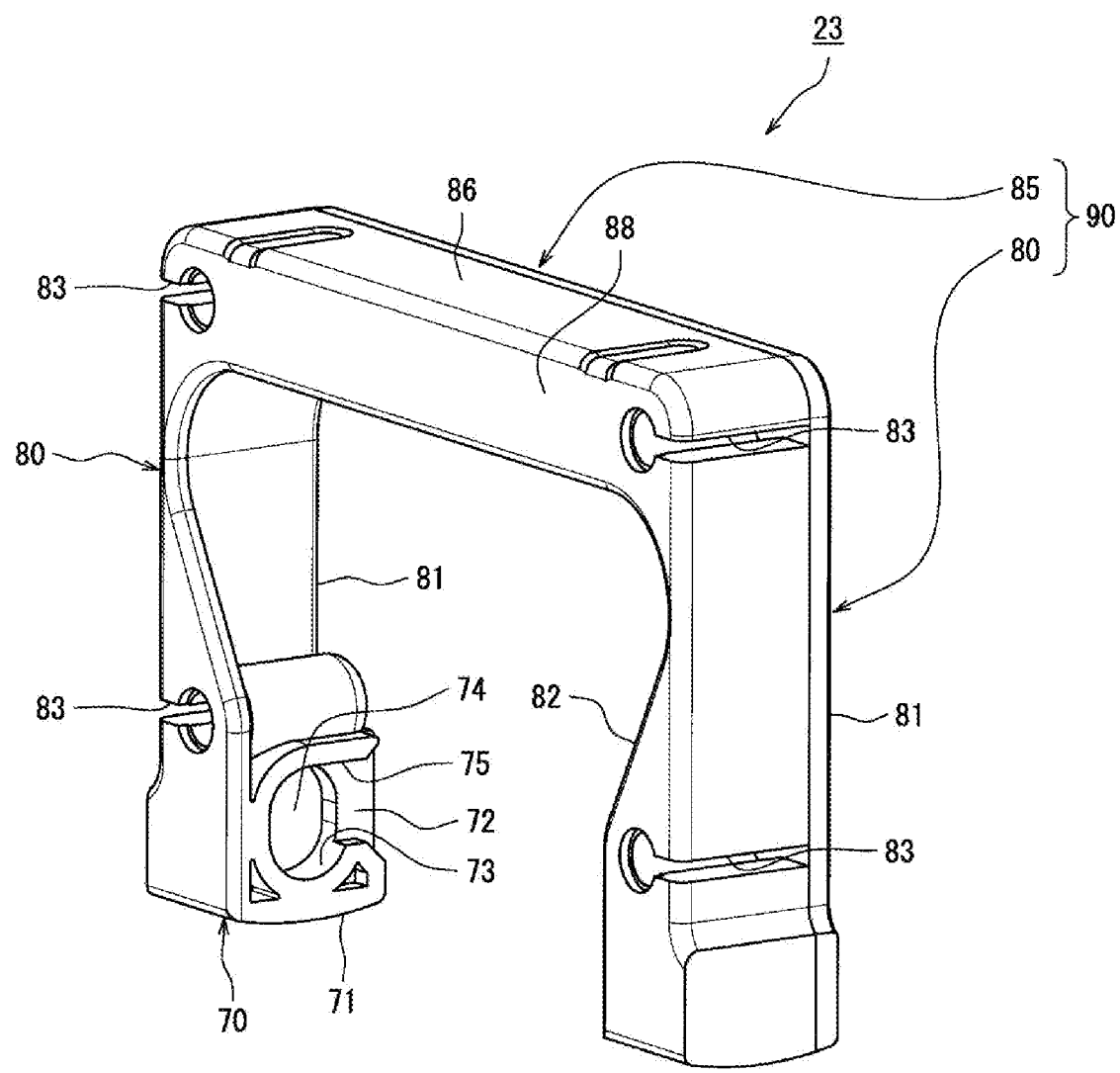
FIG. 4 is a perspective view of the handle 23 shown in FIG. 1.
Figure 5:
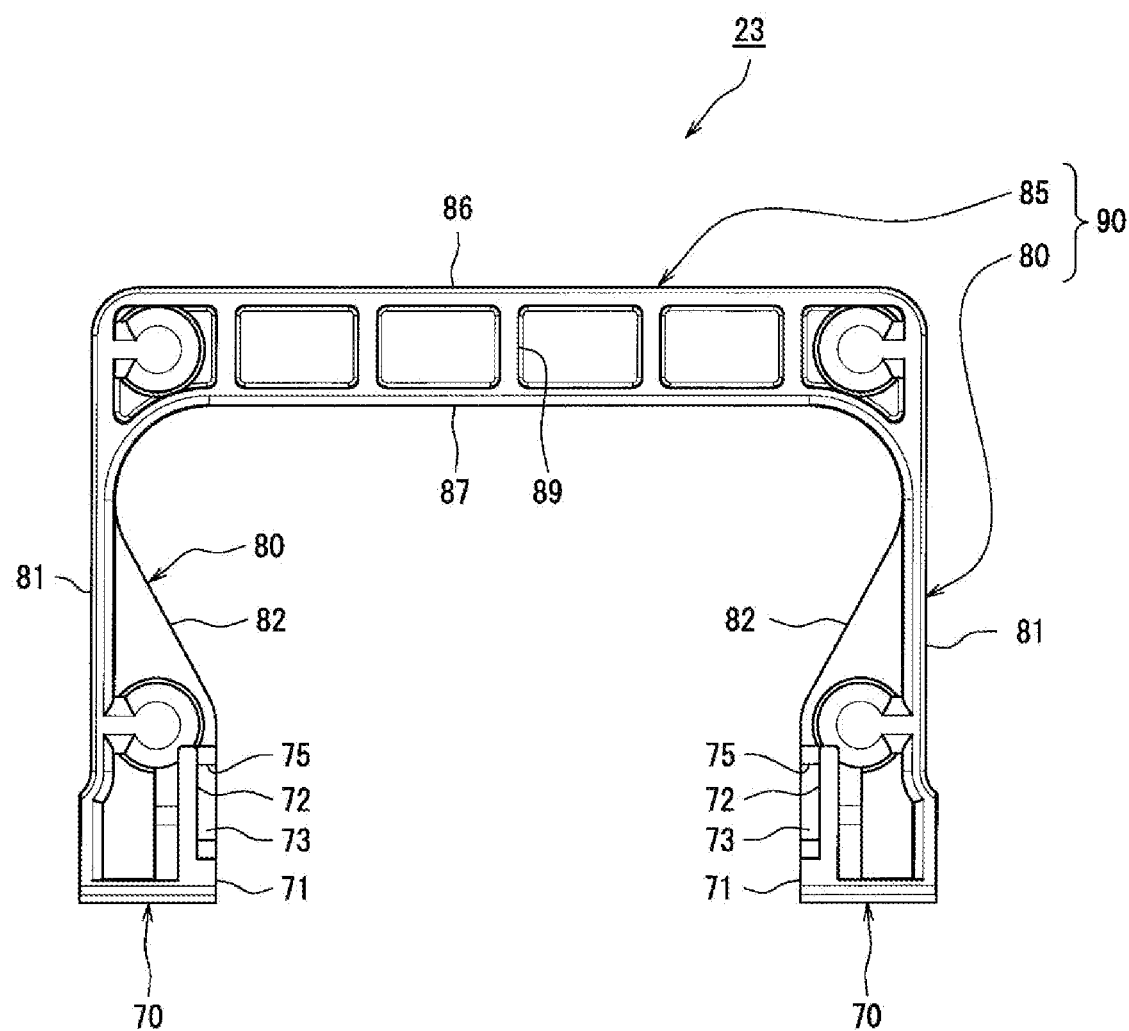
FIG. 5 is a rear view of the handle 23 shown in FIG. 1.

FIG. 4 is a perspective view of the handle 23. FIG. 5 is a bottom view of the handle 23.

Next, the structure of the handle 23 will be described with reference to FIGS. 4 and 5. As shown in FIGS. 4 and 5, the handle 23 includes the attaching portions 70 and a grip portion 90. In addition, the grip portion 90 of the handle 23 is located on the outer periphery of the first projecting portion 21 when the lid 15 is viewed from above in a plan view in a state where the handle 23 is accommodated in the lid 15.

As described above, since the handle 23 is positioned on the outer periphery of the first projecting portion 21, the degree of freedom in designing the lid 15 is improved. That is, in the lid 15 of the lead-acid battery 100, as described above, a structure such as a maze structure for refluxing an electrolyte solution and an exhaust path for discharging a gas generated in each cell chamber is provided inside the lid 15. Since it is necessary to provide such a maze structure and an exhaust path for all the cell chambers, the maze structure and the exhaust path are generally provided on the second projecting portion 22 of the lid 15. At this time, when the handle 23 is provided so as to be accommodated in the second projecting portion 22, or when the grip portion 90 of the handle 23 is provided so as to be accommodated across the first projecting portion 21 and the second projecting portion 22, the internal structure of the lid 15 is restricted. In addition, in a case where a handle having a thickness of the entire amount of the protrusion amount of the projecting portion 20 of the lid 15 is provided, the restriction of the internal structure becomes more severe.

On the other hand, the handle 23 of the lid 15 according to the present embodiment is located on the outer periphery of the first projecting portion 21. Therefore, the influence on the internal structure of the lid 15 is small, and the degree of freedom in designing the lid 15 is high. In addition, since the handle 23 is located on the outer periphery of the first projecting portion 21, the handle 23 having a thickness of the entire amount of the projecting amount of the projecting portion 20 can be provided, and the handle 23 can be easily gripped by a user of the lead-acid battery 100.

In addition, in the manufacturing process of the lead-acid battery 100, the electrolyte solution filled in the manufacturing process may remain on the upper surface of the lid. Therefore, in the manufacturing process of the lead-acid battery 100, the upper surface of the lid may be washed with water as a finishing process. At this time, in a case where the handle 23 is located on the outer periphery of the first projecting portion 21, even if water at the time of water washing enters between the handle 23 and the base portion 19 of the lid 15, the water is easily discharged to the outside, so that the water is less likely to remain between the handle 23 and the base portion 19 of the lid 15. On the other hand, considering a case where the grip portion 90 of the handle 23 is not located on the outer periphery of the first projecting portion 21, that is, a case where the first projecting portion 21 and the second projecting portion 22 are present on the outer periphery of the grip portion 90 of the handle 23, the water at the time of water washing that has entered between the handle 23 and the base portion 19 of the lid 15 is blocked by the first projecting portion 21 and the second projecting portion 22, and is hardly discharged to the outside. Therefore, in a case where the handle 23 is not located on the outer periphery of the first projecting portion 21, there is a possibility that water at the time of water washing remains between the handle and the base portion 19 of the lid 15.

Here, the water remaining after water washing contains a trace amount of an electrolyte solution component. Therefore, there is a problem that, when the lead-acid battery 100 is shipped in a container box, water at the time of water washing which remains in the lid 15 comes into contact with a container box of the lead-acid battery 100 and may corrode the container box. As described above, in the lead-acid battery 100 according to the present embodiment, since the handle 23 is located on the outer periphery of the first projecting portion 21, drainage at the time of water washing is easy. As a result, it is possible to reduce the possibility of corrosion of the container box caused by remaining of water at the time of water washing.

Furthermore, in the lid 15 of the lead-acid battery 100, a caution label on which characters and/or figures that call attention to a user of the lead-acid battery 100 are printed is attached to the upper surface. Therefore, it is necessary to provide a region for attaching the caution label on the lid 15.

In a case where the handle 23 is provided so as to be accommodated in the second projecting portion 22 or in a case where the grip portion 90 of the handle 23 is provided so as to be accommodated across the first projecting portion 21 and the second projecting portion 22, it is necessary to attach two caution labels separately when attaching a caution label having a certain size or more. On the other hand, in the lead-acid battery 100 according to the present embodiment, the handle 23 is located on the outer periphery of the first projecting portion 21. Therefore, it is possible to secure a region for attaching the caution label.

The attaching portions 70 can rotate the handle 23 with respect to the lead-acid battery 100 with the shaft portion 27 as a rotation shaft. The attaching portions 70 are provided at two positions corresponding to the shaft portion 27. The attaching portion 70 includes a fitting portion 71 fitted to the shaft portion 27. The fitting portion 71 is formed on the inner side of the handle 23 and includes a base portion 72, a sliding wall 73, a fitting groove 74, and a cutout portion 75. The sliding wall 73 is a wall portion projecting from the base portion 72. Further, the sliding wall 73 has a substantially C shape in which a part is opened, and the opened part is the cutout portion 75 in the fitting portion 71. The fitting groove 74 is a bottomed groove to which the shaft portion 27 is fitted, and is provided so as to be recessed in the outer direction from the base portion 72.

In the shaft portion 27 of the lid 15, a distance between outer end surfaces which are end surfaces in the outer direction is slightly larger than a distance between the base portions 72 of the fitting portion 71. The shaft portion 27 of the lid 15 is provided such that a distance between outer end surfaces which are end surfaces in the outer direction is smaller than a distance between bottom portions of the fitting groove 74 of the fitting portion 71. Therefore, when the handle 23 is attached to the lid 15, the shaft portion 27 is press-fitted from the cutout portion 75 of the fitting portion 71 such that the shaft portion 27 is located inside the fitting groove 74. More specifically, when the handle 23 is attached to the lid 15, the attaching portion 70 of the handle 23 and the shaft portion 27 are brought into abutment against each other such that the cutout portion 75 of the attaching portion 70 faces downward, and a force is applied from the upper side to the lower side, whereby the handle 23 can be easily attached to the lid 15.

Here, considering a case where a user of the lead-acid battery 100 grips the lead-acid battery 100 with the handle 23, the user turns the handle 23 from a state of being accommodated in the lid 15 and grips the handle 23. Therefore, when the user grips the lead-acid battery 100, the cutout portion 75 of the attaching portion 70 is not positioned on the lower side, and the shaft portion 27 is pivotally supported by the fitting groove 74 and the sliding wall 73. Therefore, even if the user grips the lead-acid battery 100 with the handle 23, the shaft portion 27 is hardly removed from the attaching portions 70.

The grip portion 90 includes a plurality of first portions 80 connected to the attaching portions 70 and a second portion 85 connected to each of the plurality of first portions 80 and extending in parallel to the direction in which the positive electrode terminal 17 and the negative electrode terminal 16 are disposed.

The handle 23 includes two first portions 80, and each of the two first portions is connected to another attaching portion 70. In addition, the first portion 80 includes an outer frame portion 81 forming the outer periphery of the handle 23 and a plate-shaped portion 82 provided to be connected to the outer frame portion 81. The outer frame portion 81 is a substantially plate-shaped member having the same width in the vertical direction as the width in the vertical direction of the projecting portion 20 of the lid 15. The plate-shaped portion 82 is a plate-shaped member provided such that the thickness direction is the vertical direction. The inner periphery of the plate-shaped portion 82 has a shape corresponding to the first projecting portion 21 in top view. That is, the plate-shaped portion 82 has a width increasing from a connection portion with the second portion 85 toward the attaching portion 70 in top view. Further, the first portion 80 is provided with attachment holes 83 for attaching a terminal cover.

The second portion 85 is provided so as to connect the two first portions 80, and includes a front plate 86, a back plate 87, a top plate 88, and ribs 89. The front plate 86 is provided continuously with the outer frame portions 81 of the first portions 80, and is a substantially plate-shaped member having a width in the vertical direction substantially equal to the width in the vertical direction of the projecting portion 20 of the lid 15, similarly to the outer frame portion 81. The front plate 86 is a portion facing the palm of the user when the user of the lead-acid battery 100 grips the lead-acid battery 100 with the handle 23.

The back plate 87 is provided so as to face the front plate 86, and is provided continuously with the outer frame portions 81 of the first portions 80. The back plate 87 is also a substantially plate-shaped member having a width in the vertical direction substantially equal to the width in the vertical direction of the projecting portion 20 of the lid 15, similarly to the outer frame portion 81. The back plate 87 is a portion on which a user's finger abuts when the user of the lead-acid battery 100 grips the lead-acid battery 100 with the handle 23.

The top plate 88 is a plate-shaped member that is provided to connect the front plate 86 and the back plate 87, and has a thickness in the vertical direction. The ribs 89 are plate-shaped members extending downward from the top plate 88, and are provided at a plurality of places so as to connect the front plate 86 and the back plate 87. An outer end portion of the second portion 85 is provided with an attachment hole 83 having a shape similar to that of the attachment hole 83 provided in the first portion 80.

As shown in FIG. 4 and the like, in the handle 23, the inner peripheral surface has a curved surface shape (R shape) at the connection portion between the first portion 80 and the second portion 85. As described above, the first portion 80 has such a shape that the width increases from the connection portion with the second portion 85 toward the attaching portion 70. Therefore, when the handle portion 23 is rotated and the user of the lead-acid battery 100 grips the lead-acid battery 100 using the handle 23, the shape of the inner periphery of the handle 23 is a substantially inverted triangular shape as shown in FIG. 4 and FIG. 5. Since the handle 23 has such a shape, for example, as compared with a case where the first portion 80 has a uniform width from the second portion 85 toward the attaching portion 70, it is possible to increase the width in which the user puts the finger while ensuring the strength of the handle 23. Therefore, it is possible to provide the lead-acid battery 100 including the handle 23 that is easy for the user of the lead-acid battery 100 to grip while ensuring the strength.

Furthermore, considering a case where the user grips the lead-acid battery 100 with the handle portion 23, the load of the lead-acid battery 100 is transmitted to the handle 23 via the shaft portion 27. Therefore, the handle 23 receives a force that deforms in the outer direction. At this time, in a case where the lid 15 does not include the opposing walls 28 provided so as to intersect the imaginary line passing through the axial center of the shaft portion 27, the handle 23 is deformed and the handle 23 may be detached from the shaft portion 27. On the other hand, the lid 15 according to the present embodiment includes the opposing walls 28 provided so as to intersect the imaginary line passing through the axial center of the shaft portion 27. Therefore, even if the handle 23 is deformed outward, the attaching portion 70 and the opposing wall 28 come into contact with each other, and the deformation amount of the handle 23 is restricted. Therefore, it is possible to provide the lead-acid battery 100 in which the handle 23 is hardly detached as compared with the case where the lid 15 does not include the opposing walls 28.

SUMMARY (1) A lead-acid battery according to an aspect of the present invention may be a lead-acid battery 100 including a container 12 in which a plurality of elements and an electrolyte solution are accommodated, the container having an opening portion, and a lid 15 for sealing the opening portion. The lid 15 may include a base portion 19 including a positive electrode terminal 17 and a negative electrode terminal 16, and a projecting portion 20 projecting from the base portion 19. The projecting portion 20 includes a handle 23 rotatably provided, and a first projecting portion 21 located between the positive electrode terminal 17 and the negative electrode terminal 16. The projecting portion 20 may include a shaft portion 27 serving as a rotation shaft of the handle 23, and an opposing wall 28 intersecting an imaginary line passing through an axial center of the shaft portion 27. The handle 23 may include an attaching portion 70 fitted to the shaft portion 27, and a grip portion 90. When the lid 15 is viewed in a plan view from a projecting direction of the projecting portion 20, the grip portion 90 may be located on an outer periphery of the first projecting portion 21.

According to the above configuration, the handle 23 is located on the outer periphery of the first projecting portion 21. Therefore, the influence on the internal structure of the lid 15 is small, and the degree of freedom in designing the lid 15 is high. In addition, since the grip portion 90 of the handle 23 is located on the outer periphery of the first projecting portion 21, the handle 23 having a thickness of the entire amount of the projecting amount of the projecting portion 20 can be provided, and the handle 23 can be easily gripped by a user of the lead-acid battery 100. In addition, since the handle 23 is located on the outer periphery of the first projecting portion 21, drainage at the time of water washing is facilitated. In addition, the lead-acid battery 100 according to the present embodiment includes the opposing walls 28 provided so as to intersect the imaginary line passing through the axial center of the shaft portion 27. Therefore, even if the handle 23 is deformed outward, the attaching portion 70 and the opposing wall 28 come into contact with each other, and the deformation amount of the handle 23 is restricted. Therefore, it is possible to provide the lead-acid battery 100 in which the handle 23 is hardly detached as compared with the case where the lid 15 does not include the opposing walls 28.

The description that "the grip portion 90 is located on the outer periphery of the first projecting portion 21" means that the grip portion 90 is disposed so as to cover the entire outer periphery of the first projecting portion 20 when the lid 15 is viewed in a plan view from the projecting direction of the projecting portion 21. That is, it is not necessary that the entire grip portion 90 is positioned on the outer periphery of the first projecting portion 21. In the present invention, the entire projecting portion 20 located between the positive electrode terminal 17 and the negative electrode terminal 16 is assumed to be the first projecting portion 21, and the description that "the grip portion 90 is located on the outer periphery of the first projecting portion 21" means that the first projecting portion 21 is not located between the grip portion 90 and the positive electrode terminal 17 or the negative electrode terminal 16.

(2) In the lead-acid battery according to an aspect of the present invention, the attaching portion 70 may include a fitting portion 71 having a cutout portion 75. When a direction in which the projecting portion 20 projects from the base portion 19 is defined as a first direction and a direction opposite to the first direction is defined as a second direction, the cutout portion 75 may be provided so as to be located on a second direction side of the fitting portion 71 in a state where the handle 23 is accommodated in the lid 15.

According to the above configuration, the attaching portion 70 of the handle 23 and the shaft portion 27 are brought into abutment against each other, and a force is applied toward the second direction side, whereby the handle 23 can be easily attached to the lid 15. When the user grips the lead-acid battery 100, the user turns the handle 23, so that the cutout portion 75 of the attaching portion 70 is not located on the second direction side. Therefore, even if the user grips the lead-acid battery 100 with the handle 23, the shaft portion 27 is hardly removed from the attaching portions 70.

(3) In the lead-acid battery according to an aspect of the present invention, the grip portion 90 may include a plurality of first portions 80 connected to the attaching portion 70, and a second portion 85 connected to each of the plurality of first portions 80, and, when the lid 15 is viewed in a plan view from the projecting direction of the projecting portion 20, the first portions 80 each may increase in width from a connection portion with the second portion 85 toward the attaching portion 70.

According to the above configuration, when the user of the lead-acid battery 100 grips the lead-acid battery 100 using the handle 23, there is given an effect of being capable of providing the lead-acid battery 100 including the handle 23 that can be easily gripped by the user of the lead-acid battery 100 while ensuring the strength of the handle 23 as compared with the case where the first portion 80 has a uniform width from the second portion 85 toward the attaching portion 70.

(4) In the lead-acid battery according to an aspect of the present invention, an attachment hole 83 for mounting a terminal cover may be provided in the handle 23.

DESCRIPTION OF REFERENCE SIGNS

12: container
15: lid
16: negative electrode terminal
17: positive electrode terminal
19: base portion
20: projecting portion
21: first projecting portion
23: handle
27: shaft portion
28: opposing wall
70: attaching portion
71: fitting portion
72: base portion 73: sliding wall
74: fitting groove
75: cutout portion
80: first portion
83: attachment hole
85: second portion
90: grip portion
100: lead-acid battery

The invention claimed is:

1. A lead-acid battery comprising:
a container in which a plurality of elements and an electrolyte solution are accommodated, the container having an opening portion; and
a lid for sealing the opening portion,
wherein the lid includes a base portion including a positive electrode terminal and a negative electrode terminal, and a projecting portion projecting from the base portion,
wherein the projecting portion includes a handle rotatably provided, and a first projecting portion which is an entirety of the projecting portion located between the positive electrode terminal and the negative electrode terminal,
wherein the projecting portion includes a pair of shaft portions each serving as a rotation shaft of the handle, and a pair of opposing walls each intersecting an imaginary line passing through an axial center of the respective shaft portion,
wherein the handle includes a pair of attaching portions each fitted to the respective shaft portion, and a grip portion,
wherein, when the lid is viewed in a plan view from a projecting direction of the projecting portion, the grip portion is located on an outer periphery of the first projecting portion,
the first projecting portion is not located between the grip portion and the positive electrode terminal or the negative electrode terminal,
wherein each of the pair of attaching portions includes a fitting portion including:
a base portion;
a sliding wall projecting in an inner direction from the base portion and having a cutout portion which is an opened part of a circumference of the sliding wall; and
a fitting groove that is a bottomed groove to which the respective shaft portion is fitted and is recessed in an outer direction from the base portion,
wherein a distance between outer end surfaces of the pair of shaft portions is larger than a distance between the base portions of the pair of attaching portions, and smaller than a distance between bottom portions of the fitting grooves of the pair of attaching portions, and
wherein, when a direction in which the projecting portion projects from the base portion is defined as a first direction and a direction opposite to the first direction is defined as a second direction, the cutout portion is provided so as to be located in the second direction in a state where the handle is accommodated in the lid.

2. The lead-acid battery according to claim 1,
wherein the grip portion includes a plurality of first portions connected to the attaching portion, and a second portion connected to each of the plurality of first portions, and
wherein, when the lid is viewed in a plan view from the projecting direction of the projecting portion, a distance between the plurality of first portions increases in width from a connection portion with the second portion toward the attaching portion.

3. The lead-acid battery according to claim 1, wherein an attachment hole for mounting a terminal cover is provided in the handle.

4. The lead-acid battery according to claim 1, wherein the cutout portion completely penetrates the sliding wall at the same side of the handle as a side of the handle at which a lower surface of the grip portion is provided, the lower surface being in contact with the base portion in the state where the handle is accommodated in the lid.

* * * * *